United States Patent
Wei et al.

(10) Patent No.: US 9,998,030 B2
(45) Date of Patent: Jun. 12, 2018

(54) CONVERTER LIFETIME IMPROVEMENT METHOD FOR DOUBLY FED INDUCTION GENERATOR

(71) Applicant: ROCKWELL AUTOMATION TECHNOLOGIES, INC., Milwaukee, WI (US)

(72) Inventors: Lixiang Wei, Whitefish Bay, WI (US); Russel J. Kerkman, Milwaukee, WI (US); Richard A. Lukaszewski, New Berlin, WI (US); Haihui Lu, Shanghai (CN); Zhenhuan Yuan, Shanghai (CN)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 632 days.

(21) Appl. No.: 14/285,497

(22) Filed: May 22, 2014

(65) Prior Publication Data
US 2014/0253055 A1  Sep. 11, 2014

Related U.S. Application Data

(62) Division of application No. 12/818,895, filed on Jun. 18, 2010, now Pat. No. 8,736,091.

(51) Int. Cl.
*H02M 7/537* (2006.01)
*H02P 9/00* (2006.01)
(Continued)

(52) U.S. Cl.
CPC .............. *H02M 7/537* (2013.01); *G05F 1/67* (2013.01); *H02M 1/32* (2013.01); *H02P 9/007* (2013.01); *G01B 3/52* (2013.01)

(58) Field of Classification Search
CPC .. H02P 9/04; H02P 9/00; H02M 7/537; G01B 3/52; G05F 1/67
See application file for complete search history.

(56) References Cited

U.S. PATENT DOCUMENTS 7,023,172 B2  4/2006  Katou
7,904,254 B2  3/2011  Ibori et al.
(Continued)

FOREIGN PATENT DOCUMENTS

WO  20070140466 A2  12/2007

OTHER PUBLICATIONS

Extended EP Search Report for EP Application No. 11170547 dated Nov. 16, 2016; 15 Pages.

*Primary Examiner* — Fred E Finch, III
*Assistant Examiner* — Rafael O De Leon Domenech
(74) *Attorney, Agent, or Firm* — Fletcher Yoder, P.C.

(57) ABSTRACT

The present techniques include methods and systems for operating converter to maintain a lifespan of the converter. In some embodiments, the operating frequency of the converter may be increased such that stress may be reduced on the bond wires of the converter. More specifically, embodiments involve calculating the aging parameters for certain operating conditions of the converter operating in a maximum power point tracking (MPPT) mode and determining whether the MPPT operation results in aging the converter to a point which reduces the converter lifespan below a desired lifespan. If the MPPT operation reduces the converter lifespan below the desired lifespan, the frequency of the converter may be increased such that the converter may be controlled to operate at a percentage of MPPT. Thus, in some embodiments, power output may be optimized with respect to maintaining a desired lifespan of the converter.

20 Claims, 5 Drawing Sheets

(51) Int. Cl.
   *G05F 1/67*      (2006.01)
   *H02M 1/32*      (2007.01)
   *G01B 3/52*      (2006.01)

(56) References Cited

U.S. PATENT DOCUMENTS

| | | |
|---|---|---|
| 8,035,240 B2 | 10/2011 | Erdman et al. |
| 8,159,178 B2 | 4/2012 | Serban |
| 8,736,091 B2 * | 5/2014 | Wei .................. H02M 1/32 290/44 |
| 2003/0214821 A1 | 11/2003 | Giannopoulos et al. |
| 2005/0043910 A1 | 2/2005 | Knebel et al. |
| 2005/0071090 A1 | 3/2005 | Katou |
| 2009/0276165 A1 | 11/2009 | Weiss et al. |
| 2011/0101689 A1 | 5/2011 | Larsen et al. |
| 2011/0101990 A1 | 5/2011 | Noorlag et al. |

* cited by examiner

CONVERTER LIFETIME IMPROVEMENT METHOD FOR DOUBLY FED INDUCTION GENERATOR

CROSS REFERENCE TO RELATED APPLICATIONS

This application is a divisional of U.S. patent application Ser. No. 12/818,895, entitled "Converter Lifetime Improvement Method for Doubly Fed Induction Generator", filed Jun. 18, 2010, which is herein incorporated by reference.

BACKGROUND

The invention relates generally to the field of electrical power converters and inverters. More particularly, the invention relates to techniques for preventing or forestalling failure of motor drive circuitry due to overheating.

Power inverters and converters typically employ power modules to create a desired output current waveform, which is used to power various devices, such as motors and other equipment. The frequency and amplitude of the output current waveform may affect the operation of the device such as by changing the speed or torque of a motor, for example. Some power modules create the desired output current waveform through pulse width modulation, wherein power semiconductor switches such as insulated gate bipolar transistors (IGBTs) are caused to switch rapidly on and off in a particular sequence so as to create an approximately sinusoidal output current waveform. Furthermore, high transistor switching speeds tend to produce a smoother, more ideal sinusoidal waveform, which may be desirable in some applications. For example, in heating, ventilating, and air conditioning systems a smoother sinusoidal waveform will reduce system noise and vibrations.

Higher transistor switching speeds may tend, however, to increase the junction temperature of the transistors, which may result in more mechanical stress and increased rates of transistor failure over time. Attempts have been made to reduce transistor failure by limiting the maximum absolute transistor junction temperatures. However, these techniques have failed to account for the increased stresses that tend to occur under start-up conditions or low-speed conditions, wherein the transistors tend to experience high current at low output frequency. For example, a power converter used as a doubly fed induction generator converter may typically operate in a maximum power point tracking (MPPT) condition, at which the converters operate at a relatively low frequency and high output current. Such low frequency conditions may contribute to electrical failures of the converter.

It may be advantageous, therefore, to provide a system and method of reducing the thermal stresses due to a continuous MPPT operation mode of the converter. Specifically, it may be advantageous to provide a method of reducing temperature variations of the transistor junction, i.e. the semiconductor chip itself, and the case, i.e. the package in which the semiconductor chip is contained.

BRIEF DESCRIPTION

The present invention relates generally to a transistor protection mechanism configuration designed to address such needs. Embodiments include systems and methods of reducing the operating frequency of a converter to avoid high junction temperature variation and stress on the bond wires. Embodiments also include methods of estimating the expected junction temperature variation and other associated parameters, such as number of cycles to failure and aging per second of the converter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate to reducing the mechanical stress on solid state switching devices, such as IGBTs due to large temperature variations of the junction. Large junction temperature variations may contribute to particularly high levels of mechanical stress, because the different expansion rates of the various materials inside the transistor package may lead to wire crack growth in wire bonds and similar contacts. Therefore, reducing junction temperature variations may result in a longer lasting converter module. In embodiments of the present invention, adverse affects of junction temperature variation is reduced by controlling the operating frequency of the converter module. Because the highest junction temperature variations tend to occur during operating conditions (e.g., start-up or low-frequency, high-current conditions), an aging parameter of the converter may be monitored, and the operating frequency may be increased when the aging parameter exceeds a certain threshold. In some embodiments, increasing frequency to reduce or prevent unacceptable aging may result in operating the converter below an MPPT operational mode, such that the converter outputs less than a maximum level of power. Thus, in embodiments may include optimizing a converter performance with respect to both converter lifespan and power output.

Figure 1:
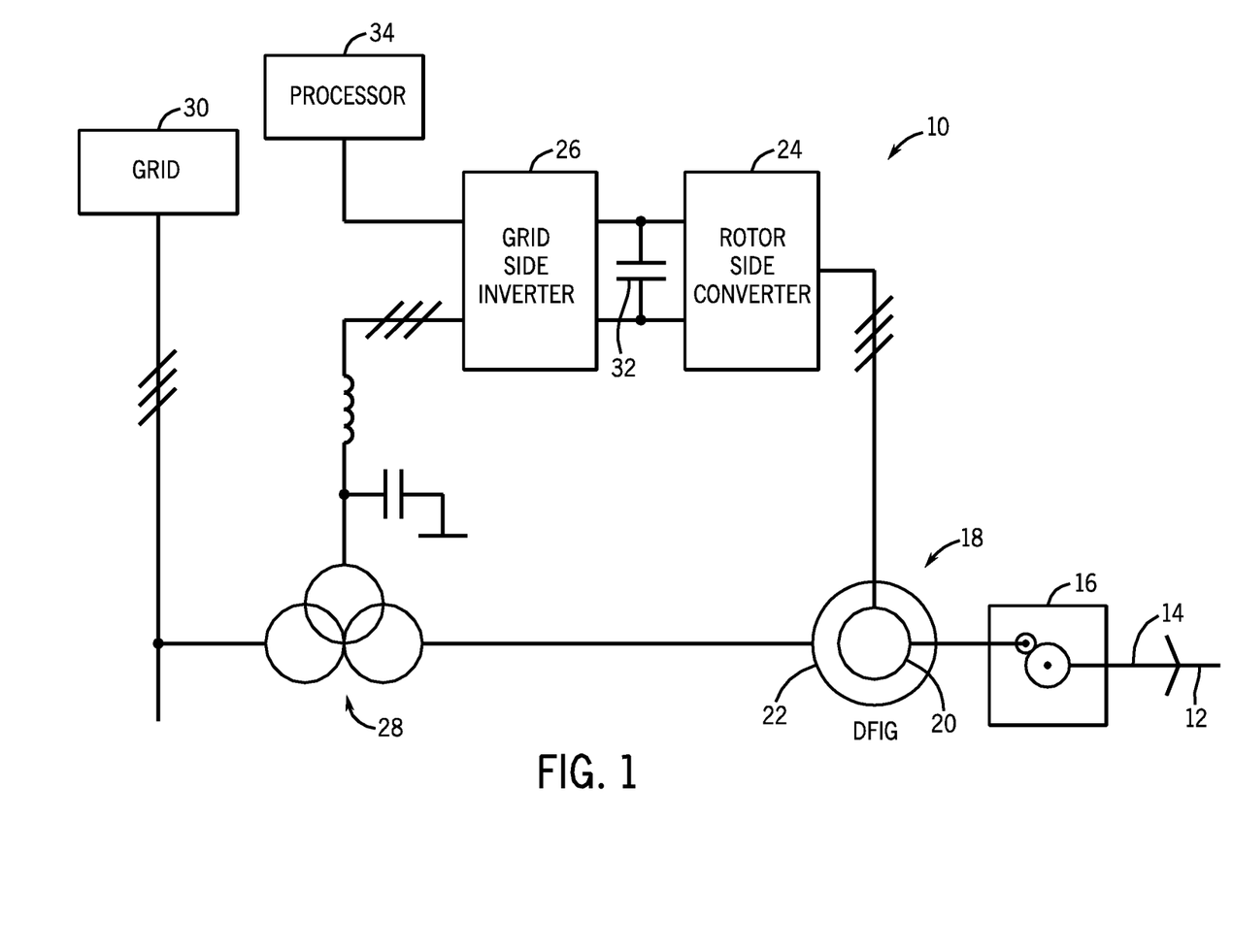
FIG. 1 is a block diagram of an exemplary application for a variable frequency drive, in the form of a wind power converter system which may include an adjustable speed inverter, in accordance with an embodiment of the present techniques.

Turning to the figures, FIG. 1 depicts an exemplary application in the form of a wind power system 10 which may include an adjustable speed inverter, in accordance with the present disclosure. It should be noted that a wind power system 10 is provided as one example for which present techniques of adjusting the speed of a converter to forestall converter failure may be implemented.

Referring again to the example provided in FIG. 1, the wind power system 10 may be suitable for capturing power from wind using turbine blades 12 and converting the captured wind power into mechanical power, and the mechanical power into electrical power. The system 10 may include a gearbox 16 connected to the turbine rotor 14 of the turbine blades 12. The gearbox 16 may adapt the relatively low speed of the turbine rotor 14 with the relatively high speed of a generator 18.

The generator 18 may convert the mechanical power into electrical power, and may be, for example, an induction generator or a synchronous generator. For example, the generator 18 illustrated in FIG. 1 may be a doubly fed induction generator (DFIG), which includes a rotor winding 20 and a stator winding 22. The stator winding 22 of the generator 18 may be connected to a transformer 28 which transfers electrical power through inductively coupled conductors to a suitable voltage level for an electrical grid 30. The grid 30 may be an interconnected network which delivers electrical power to various other electrical devices or networks. The rotor winding 20 of the generator 18 may be connected to the grid 30 by the converter 24 and inverter 26 which decouple mechanical and electrical frequencies (e.g., to enable variable-speed operation).

The system 10 may include a converter and inverter module including a three-phase AC-DC converter 24 and a three-phase DC-AC inverter 26. The converter 24 and inverter 26 may be linked by a DC capacitor battery 32. The converter 24 may be connected to the rotor winding 20 of the generator 18, and may also be referred to as the rotor side converter 24. The inverter 26 may be connected to the grid 30 by the transformer 28, and may also be referred to as the grid side inverter 26. The bidirectional converter and inverter 24 and 26 may enable vector control of the active and reactive powers delivered to the grid 30 and may also increase power quality and angular stability and decrease the harmonic content introduced into the grid 30 (e.g., via filters).

The converter 24 and inverter 26 may be used for varying levels of power control, and may sometimes output relatively high power (voltage and current). The converter 24 and inverter 26 may include transistors and antiparallel diodes for switching and converting such voltages. In some embodiments, the system 10 may include one or more processors 34 for controlling an operation of the inverter 26. For example, and as will be discussed, the processor 34 may change the switching frequency or output current of transistors in the inverter 26 to decrease power loss and junction temperature variations which may be affected by the operations of the transistors in the inverter. The processor 34 may further be suitable for executing algorithms and computing parameters associated with operations of the inverter.

Figure 2:
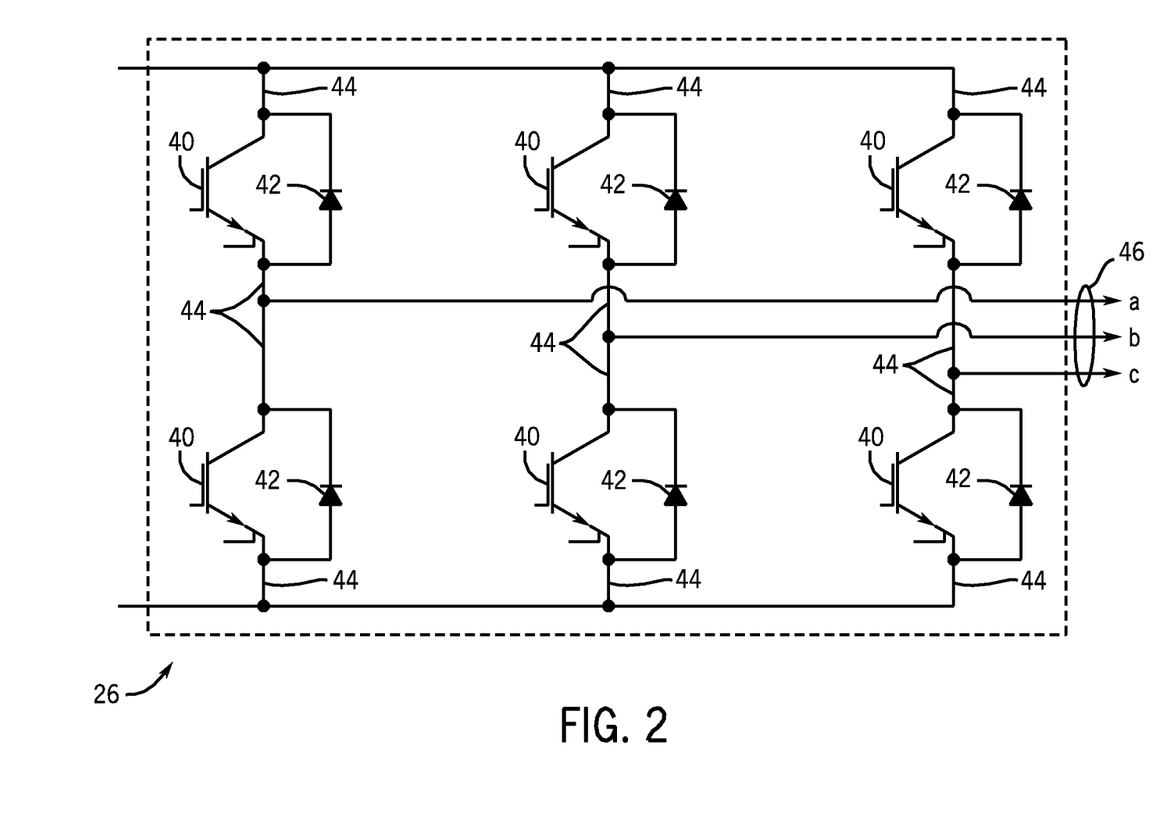
FIG. 2 illustrates a schematic diagram of an inverter in the exemplary application of FIG. 1, in accordance with an embodiment of the present techniques.

One example of an inverter 26 in some embodiments is provided in FIG. 2. The inverter 26 may include a plurality of insulated gate bipolar transistors (IGBTs) 40 and power diodes 42, each diode 42 configured antiparallel to a respective IGBT 40. The IGBTs 40 and power diodes 42 are joined to positive or negative DC lines (as appropriate) and output lines a, b, or c with bond wires 44. For example, the output lines a, b, and c of the output 46 may output the three-phase voltages $v_a$, $v_b$, and $v_c$. The rapid on and off switching of the IGBTs 40 to produce a discretized three-phase output current waveform at the output 46 may result in conduction losses and switching losses, which may result in a higher junction temperature at the IGBTs 40. Such junction temperatures may result in strain and/or deformation of the bond wires 44, which may shorten the lifespan of the inverter 26.

Though the example of an inverter 26 provided in FIG. 2 relates generally to an inverter of a wind power system 10, the present embodiments may apply to any inverter module having switching transistors, as high junction temperatures may strain and/or deform the transistors and/or bond wires of a typical inverter. As used herein, an inverter 26 may refer to any inverter module in an electronic system, and the IGBTs 40 may refer to any type of switching transistor (and is not limited to an IGBT).

Accordingly, embodiments of the present invention include a method of estimating the peak junction temperature in an inverter module. In some embodiments, the estimated peak junction temperature may be based on the estimated power losses of the IGBTs 40. Furthermore, the estimated power losses of the IGBT 40 may be based on estimated operating conditions of the IGBTs 40. For example, peak IGBT 40 junction temperature estimates may be based on approximated conduction losses and switching losses as calculated according to the following equations:

$$P_c(f, I_{RMS}) = \left(\frac{1}{2\cdot\pi} + \frac{M(f)\cdot PF}{8}\right)\cdot V_t \cdot \sqrt{2}\cdot I_{RMS} + \left(\frac{1}{8} + \frac{M(f)\cdot PF}{3\cdot\pi}\right)\cdot R_t \cdot 2\cdot I_{RMS}^2, \tag{1}$$

$$P_s(f_s, I_{RMS}) = \frac{1}{\pi}\cdot f_s \cdot E_{onoff} \cdot \left(\frac{\sqrt{2}\cdot I_{RMS}}{I_{nom}}\right)\cdot\left(\frac{V_{DC}}{V_{nom}}\right), \text{ and} \tag{2}$$

$$PI(f, f_s, I_{RMS}) = P_c(f, I_{RMS}) + P_s(f_s, I_{RMS}), \tag{3}$$

where $P_c$ is the estimated conduction power loss as a function of the fundamental frequency, f, and the output RMS current of the drive, $I_{RMS}$, $P_s$ is the estimated switching power losses as a function of the switching frequency, $f_s$, and the output RMS current of the drive, $I_{RMS}$, and $PI(f, f_s, I_{RMS})$ equals the total estimated power losses of the IGBT 40. In equation (1), M(f) represents the modulation index and PF represents the power factor of a load driven by the inverter 26. In equation (1), $V_t$ represents the approximate IGBT 40 conduction voltage at small or near zero forward current and $R_t$ represents the approximate slope resistance. Both $V_t$ and $R_t$ may be derived from a manufacturer datasheet for the transistor (e.g., IGBT 40) used in the inverter 26. In equation (2), $E_{onoff}$ represents the total energy required to switch the IGBT 40 on and off at a rated voltage $V_{nom}$ (half of the IGBT rated voltage) and current $I_{nom}$ (rated IGBT module current) of the IGBT 40. All three of $E_{onoff}$, $V_{nom}$, and $I_{nom}$ may be obtained from manufacturer data sheets. $I_{RMS}$ and $V_{DC}$ represent the estimated output current and bus voltage of the IGBT 40.

The total power loss P may affect the junction temperature variation ($\Delta T_j$), which decreases the lifespan of the inverter 26. In some embodiments, the calculation of the junction temperature variation, $\Delta T_j$, may be simplified by assuming that the temperature variation of the case is negligible. As such, a "boost factor" (BF(f)) may be first approximated according to the following equation:

$$BF(f) = 1 + \sum_{i=1}^{4} \frac{R_i}{R_{jc}} \cdot \frac{\pi - 1}{\sqrt{1 + (2\pi\cdot f\cdot\tau_i)^2}}, \tag{4}$$

where $R_i$ and $\tau_i$ equal the thermal resistances and capacitances of the thermal network of the inverter 26, $R_{jc}$ equals the overall thermal resistance between the junction and the case, and f represents the frequency of the converter. Furthermore, an interim value, $BF\_\Delta T_j$, may be calculated from the boost factor, according to the following equations:

$$BF\_\Delta T_j(f) = 1.85 \cdot (BF(f)-1) \text{ if } BF(f) < 2 \qquad (5);$$

$$BF\_\Delta T_j(f) = BF(f) \text{ if } BF(f) \geq 2 \qquad (6).$$

Having obtained the estimated power losses and the boost factor, the estimated junction temperature variation, $\Delta T_j$, may then be approximated according to the following formula:

$$\Delta T_j(f,f_s,I_{rms}) = PI(f,f_s,I_{rms}) \cdot BF\_\Delta T_j(f) \cdot R_{jc} \qquad (7),$$

where $\Delta T_j$ represents the junction temperature variation after one output cycle of the inverter module. As represented by the above equation, the junction temperature variation $\Delta T_j$ of the inverter module may be a function of the frequency f, switching frequency $f_s$, or drive current $I_{RMS}$. Thus, in some embodiments, operating the inverter at a lower switching frequency $f_s$ may result in a lower junction temperature variation $\Delta T_j$.

It will be appreciated that variations of the above formulas may be made while still falling within the scope of the present invention. Additionally, in some embodiments one or more of the variables, such as $I_{RMS}$, $E_{onoff}$ or $V_{DC}$ for example, may be measured. Alternatively, these variables may also be estimated based on average known operating conditions of typical inverter modules or a particular inverter module. Additionally, in some embodiments, the diode 42 junction temperature variation may be estimated rather than the IGBT 40 junction temperature variation.

The mean junction temperature $T_m$ can be calculated using a negative temperature coefficient (NTC) sensor. Generally, the NTC temperature sensor is embedded inside or on a heatsink near the IGBT module. When the NTC temperature sensor is embedded near the IGBTs 40, the average junction temperature of the IGBTs 40 can be approximately by the following equations $$T_m = T_{ntc} + PI \cdot \sum_{i=1}^{4} \frac{R_i}{1+sR_iC_i} + PI \cdot \frac{R_{ii}}{1+sR_{ii}C_{ii}} + PI \cdot \frac{R_{di}}{1+sR_{di}C_{di}}, \qquad (8)$$

where PI represents losses of the IGBTs 40 and $R_i$ and $C_i$ represents the thermal resistance an capacitance, respectively. $R_{ii}$ and $C_{ii}$ represent the thermal resistance and thermal capacitance, respectively, between IGBT case layer and the NTC sensor. $R_{di}$ and $C_{di}$ represent the thermal resistance and capacitance between diode and the NTC sensor. $T_{ntc}$ represents the temperature measured by the NTC sensor. The parameters $R_{ii}$, $C_{ii}$, $R_{di}$ and $C_{di}$ can be extracted parameters from the inverter 26.

In some embodiments, the number of cycles to failure ($N_f$) for the IGBT can be estimated using different algorithms. For instance, one example of how the number of cycles to failure is estimated is provided in U.S. Patent Application Number 20090276165 and summarized by the relationship below:

$$N_f(f) = N_f(T_m, \Delta T_j, f) \qquad (9),$$

where $T_m$ is the average junction temperature. In some embodiments, the number of cycles to failure $N_f$ of an IGBT 40 may be determined based on a look up table. In other embodiments, different methods may also be used to estimate the number of cycles to failure, and may be based on the parameters of the inverter and/or electronic system.

The number of cycles to failure $N_f$ may be used to determine the aging of the inverter module. Aging refers to an estimated decrease in the amount of lifetime remaining for an inverter, and an aging_per_second parameter represents the lifetime decrease per second. For example, the aging speed of an inverter can be calculated by the following equation:

$$\text{Aging\_per\_second} = f/N_f(\Delta T_j, T_m, f) \qquad (10)$$

One or more embodiments include techniques for adjusting the frequency of an inverter or converter to possibly increase its lifespan and/or forestall its failure. For example, one technique may be represented by the flow chart of the process 50 in FIG. 3. The process may begin by operating (block 52) the converter in a maximum power point tracking (MPPT) mode. Operating the converter in MPPT mode may involve using a converter frequency, and/or current, etc. to operate the converter such that a maximum power output is produced. A typical converter generally operates in a MPPT mode, such that power output is maximized.

Figure 3:
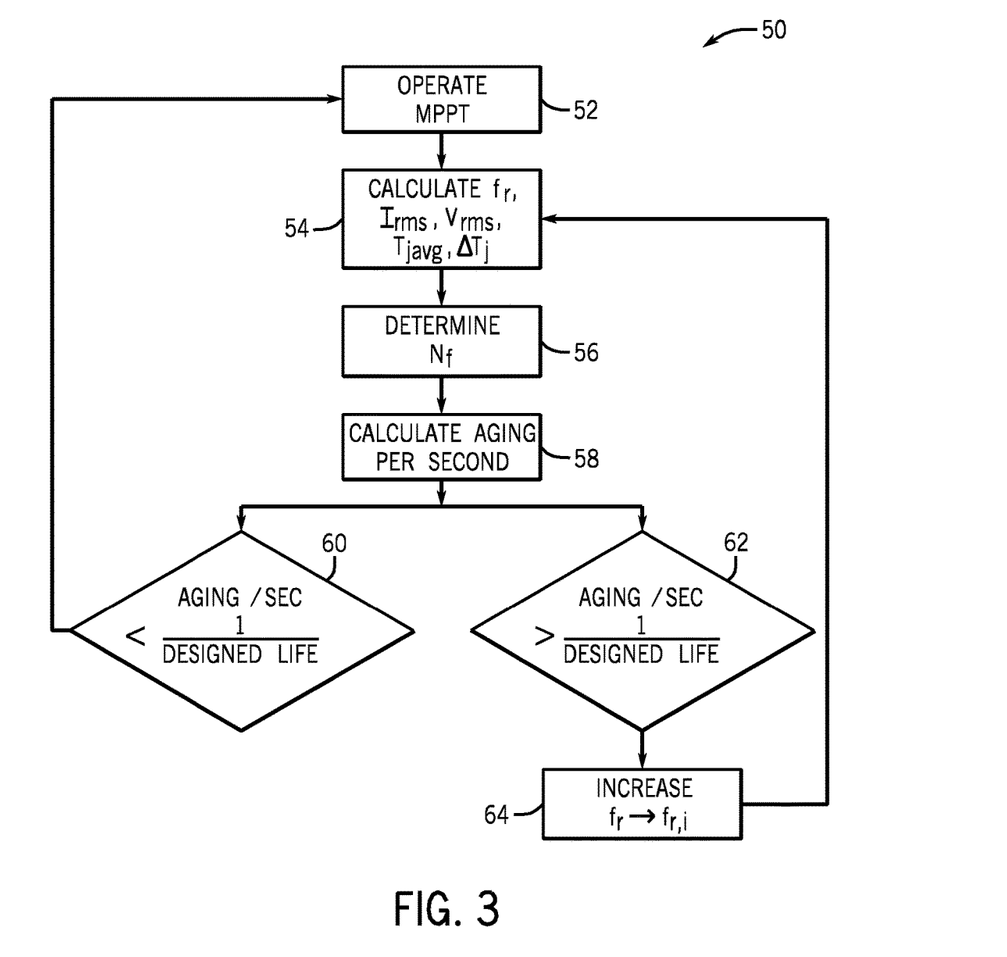
FIG. 3 is a flow chart summarizing a process for changing the operation mode of a converter such that a certain lifespan of the converter may be maintained, in accordance with an embodiment of the present techniques.

However, operating a converter in MPPT mode may shortens the lifespan of the converter under certain operating conditions (e.g., when output frequency is low), as the low frequency of the converter may increase the junction temperature variation $\Delta T_j$ (as represented by equations 4-7), which decreases the number of cycles to failure $N_f$ (as represented by equation 9), thus increasing the aging_per_second parameter (as represented by equation 10) of the converter during the time the converter is operating in MPPT.

Therefore, to forestall converter failure and/or maintain a certain lifespan of the converter, the process 50 may involve changing a mode of operation of the converter to operate at a different (e.g., higher) frequency based on how the operational mode is affecting the converter's aging parameters. While power output may also decrease such that the converter is no longer operating at MPPT, the junction temperature variation $\Delta T_j$ and the aging_per_second of the converter may also decrease, thus preserving the converter lifespan. Therefore, in present embodiments, the operation of a converter may be optimized between power output and converter lifespan preservation to optimize the overall cost efficiency of the converter.

To determine whether the estimated lifespan of the converter for an MPPT mode of operation is below a desired lifespan, the process 50 may calculate (block 54) the operating frequency f of the converter, the output current $I_{RMS}$, and the voltage $V_{RMS}$, based on the active and reactive power command of the converter. Further, the process 50 may calculate the average junction temperature $T_{j,avg}$ and the junction temperature variation $\Delta T_j$, using algorithms such as those discussed above. Using the calculated parameters, the process 50 may determine (block 56) the number of cycles to failure $N_f$ of the converter. This determination may be made by using various algorithms (e.g., equation 9), or based on a look up table. Further, the aging_per_second of the converter may be determined (block 58) based on the number of cycles to failure $N_f$ of the converter (e.g., equation 10).

The process 50 may compare the aging_per_second of the converter for the MPPT operation mode with the inverse of the designed_life. The designed_life may be a preferred lifespan of the converter in seconds to be maintained, and comparing the aging_per_second of the converter with the inverse of the designed_life, measured in seconds, may determine whether an operational mode (e.g., MPPT) of the converter is aging the converter at a rate (e.g., aging_per_second) which would cause the converter to fail prior to the designed_life.

If the aging_per_second is less than the inverse of the designed_life (block 60) the converter may continue to operate (block 52) in MPPT mode. This condition may be represented by the relationship below:

$$\text{aging\_per\_second} < \frac{1}{\text{designed\_life}}. \qquad (11)$$

If the aging_per_second is greater than the inverse of the designed_life (block 62), the MPPT operational mode of the converter may be causing the converter to age at a rate which will result in a shorter lifespan than the designed_life. If the process 50 determines this condition, which is represented by the relationship below, $$\text{aging\_per\_second} > \frac{1}{\text{designed\_life}}, \qquad (12)$$

the process 50 may increase (block 64) the frequency f of the converter to a higher frequency $f_1$. As previously discussed, increasing the frequency of the converter may reduce the junction temperature variation $\Delta T_j$, and as a result, the aging_per_second of the converter. The higher frequency $f_1$ may be a frequency at which the aging_per_second is equal to the inverse of the designed_life. In some embodiments, the adjustment of the frequency may also affect the operation of the DFIG 18. For example, the DFIG 18 may operate at variable speeds, and may be synchronous, super-synchronous, or sub-synchronous. When the DFIG 18 is operating at super-synchronous speeds (i.e., higher than synchronous speed with the converter 24), the speed of the DFIG 18 may be increased to power the rotor side converter 24 with the increased frequency $f_1$. When the DFIG 18 is operating at sub-synchronous speeds (i.e., lower than synchronous speed with the converter 24), the speed of the DFIG 18 may be decreased to power the rotor side converter 24 at the increased frequency $f_1$.

In some embodiments, the process 50 may be performed dynamically or performed at intervals. For example, the process 50 may be performed at set time intervals, or the process 50 may be performed whenever operating changes in the system 10 occur. By continuously applying the process 50, an operating frequency f may be selected to maintain a desired lifespan of the converter and/or to optimize the power output of the converter with the desired lifespan of the converter.

Figure 4:
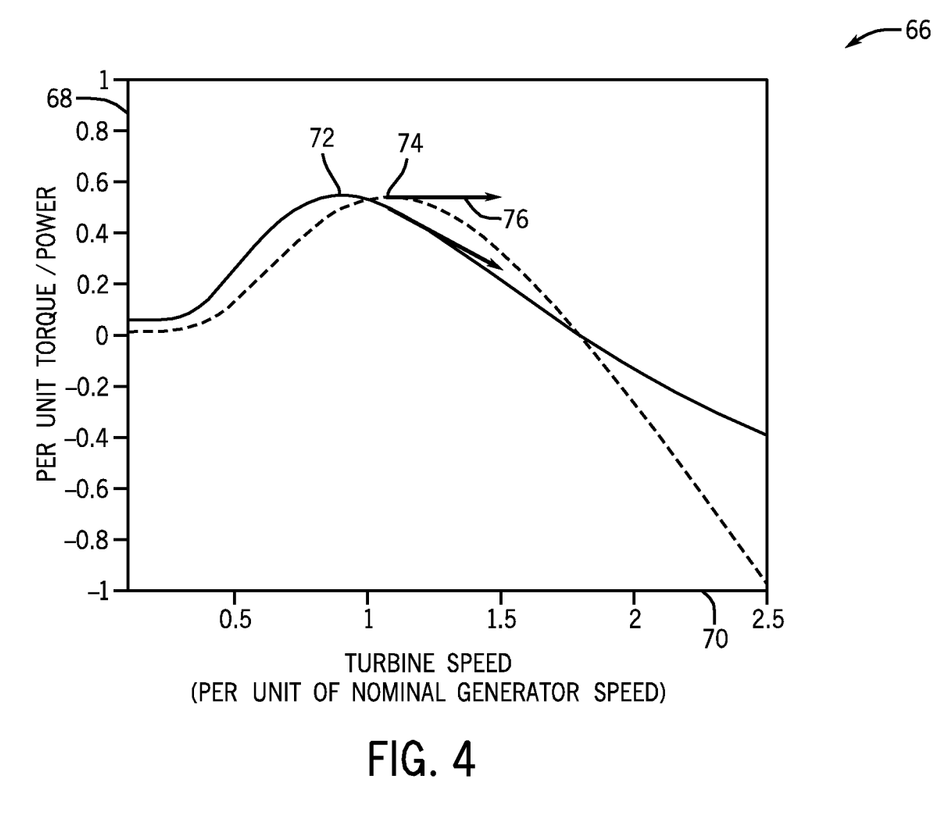
FIG. 4 is a plot representing the relationship between the power output and an electrical torque of a turbine generator over a generator speed range at a fixed wind speed, in accordance with an embodiment of the present techniques.

For example, the plot 66 of FIG. 4 illustrates the per unit torque or power of the output power 74 of a wind turbine and the electrical torque 72 of the wind turbine over a speed range 70. An MPPT operational mode of the converter may be represented by the highest level 76 of the output power 74. As shown, increasing (block 64 in FIG. 4) the speed 70 beyond the MPPT level 76 results in a decrease in the output power 74. However, within a certain frequency range (e.g., from approximately 1 to 1.7 in this plot 66, though the scale may vary depending on the converter and the system), the electrical torque 72 may decrease faster than the power output 74, such that the torque current of the converter also decreases faster than the power output 74. As discussed, a decrease in the torque current may result in a reduced junction temperature variation $\Delta T_j$. The greater decrease of the torque current than the power output within a certain increased frequency range may enable an optimization between decreased power output (e.g., not at MPPT) and increased lifespan of the converter.

Figure 5:
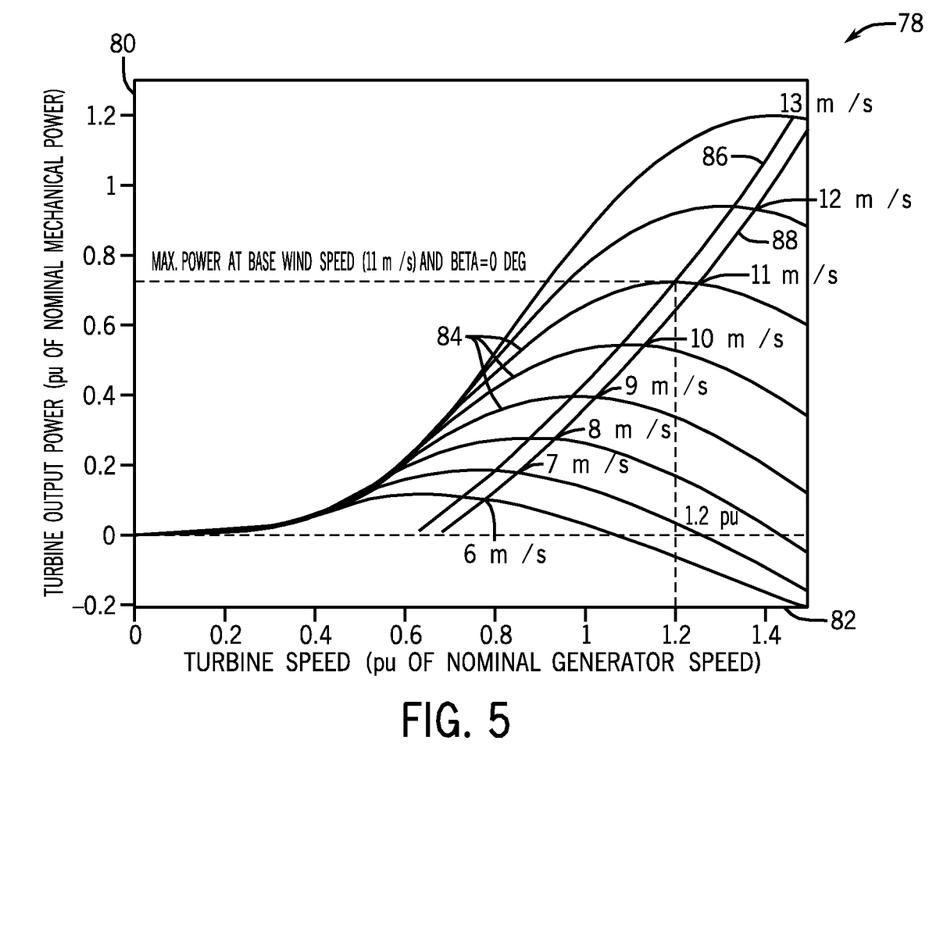
FIG. 5 is a plot representing the power output of different wind speeds over a range of operating frequencies, and a comparison of an operation at MPPT and an operation at less than MPPT, in accordance with an embodiment of the present techniques.

In embodiments of maintaining the lifespan of a converter in a wind power system 10 (FIG. 1), increasing a converter speed depends on different factors such as the speed of wind received by rotor blades 12 of the system 10. For example, as provided in the plot 78 of FIG. 5, the relationship between output power 80 and converter frequency 82 are provided for different wind speeds 84. Further, the trace 86 represents a power output 80 with respect to converter frequency 82 at different wind speeds 84. Increasing the converter frequency 82 also lowers the power output 80 by a certain amount depending on the wind speed 84. For example, the trace 88 represents an operational mode of the converter that is at approximately 90%-100% MPPT 88 (e.g., outputting only 90%-100% of the maximum power).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a converter configured to couple to a generator; and
   a processor configured to communicate with the converter such that the processor is capable of controlling one or more operational characteristics of the converter, wherein the processor is configured to calculate an aging parameter of the converter and to change an operation mode of the converter from a maximum power point tracking (MPPT) mode to a reduced power output mode when the aging parameter exceeds a threshold parameter for achieving a desired lifespan of the converter, wherein the reduced power output mode is a predetermined percentage of the MPPT mode.

2. The system of claim 1, comprising the generator including a doubly-fed induction generator (DFIG).

3. The system of claim 1, wherein the converter comprises a plurality of transistors comprising a plurality of insulated gate bipolar transistors (IGBTs).

4. The system of claim 1, wherein the processor is configured to calculate the aging parameter of the converter by calculating a number of cycles to failure of the converter.

5. The system of claim 1, wherein the predetermined percentage is based on an optimization between power output by the converter and the desired lifespan of the converter.

6. The system of claim 1, wherein the processor is configured to change the operation mode of the converter to the reduced power output mode by increasing an operating frequency of the converter regardless of a speed of a rotor of the generator.

7. The system of claim 1, wherein the converter is part of a wind power converter system.

8. A method, comprising:
   calculating an aging parameter of a line-side inverter configured to couple to a rotor-side converter with a processor in communication with the rotor-side converter, wherein the rotor-side converter is configured to couple to a generator; and
   changing, via the processor, a first operational mode of the rotor-side converter to a second operational mode when the aging parameter exceeds a threshold parameter for achieving a desired lifespan of the line-side inverter, wherein changing the first operational mode to the second operational mode comprises changing the rotor-side converter from a maximum power point tracking (MPPT) operation to a predetermined percentage of the MPPT operation.

9. The method of claim 8, wherein calculating the aging parameter comprises calculating a junction temperature variation of one or more power devices in the line-side inverter.

10. The method of claim 8, wherein calculating the aging parameter comprises determining a frequency, a current, and a voltage that correspond to the line-side inverter based on the first operational mode of the rotor-side converter.

11. The method of claim 8, wherein calculating the aging parameter comprises calculating a number of cycles of the line-side inverter to an estimated failure of the line-side inverter.

12. The method of claim 8, wherein calculating the aging parameter comprises determining an estimated number of cycles of failure of the line-side inverter based on the first operational mode of the rotor-side converter.

13. The method of claim 8, wherein changing the first operational mode to the second operational mode comprises outputting a maximum power from the rotor-side converter when the rotor-side converter is operating in the first operational mode and outputting less than the maximum power from the rotor-side converter when the rotor-side converter is operating in the second operational mode.

14. The method of claim 8, wherein the predetermined percentage is based on an optimization between power output by the rotor-side converter and the desired lifespan of the line-side inverter.

15. The method of claim 8, wherein the aging parameter is calculated continuously while the rotor-side converter is operating.

16. A processor, configured to:
    determine an aging parameter of a converter configured to couple to a generator when the converter is operating in a maximum power point tracking (MPPT) mode;
    compare the aging parameter with a threshold, wherein the threshold is based on a desired lifespan of the converter; and
    change an operation of the converter to a reduced power output mode when the aging parameter exceeds the threshold, wherein the reduced power output mode is a predetermined percentage of a MPPT operation.

17. The processor of claim 16, wherein the aging parameter is determined by calculating an aging per second of the converter operating at the MPPT mode.

18. The processor of claim 16, configured to increase a fundamental frequency of the converter when the aging parameter exceeds the threshold regardless of a speed of a rotor of the generator.

19. The processor of claim 16, wherein the predetermined percentage is based on an optimization between power output by the converter and the desired lifespan of the converter.

20. The processor of claim 16, wherein the aging parameter of the converter is determined at intervals.

* * * * *